United States Patent [19]

Weisert et al.

[11] 4,220,276
[45] Sep. 2, 1980

[54] METHOD FOR FABRICATING SUPERPLASTICALLY FORMED/DIFFUSION BONDED STRUCTURES

[75] Inventors: Edward D. Weisert, Rolling Hills Estates; Suphal P. Agrawal, Torrance, both of Calif.

[73] Assignee: Rockwell International Corporation, El Segundo, Calif.

[21] Appl. No.: 936,982

[22] Filed: Aug. 25, 1978

[51] Int. Cl.³ .................... B23K 20/18; B23K 20/22
[52] U.S. Cl. .................................. 228/118; 228/157; 228/193; 164/14
[58] Field of Search ............... 228/118, 157, 193, 233, 228/234; 106/73.2; 148/22; 164/14, 72

[56] References Cited

U.S. PATENT DOCUMENTS

| | | | |
|---|---|---|---|
| 3,638,298 | 2/1972 | Sinizer et al. | 228/118 |
| 3,834,000 | 9/1974 | Miller | 228/118 X |
| 3,906,617 | 9/1975 | Behringer et al. | 228/118 |
| 3,927,817 | 12/1975 | Hamilton et al. | 228/157 |
| 4,040,845 | 8/1977 | Richerson et al. | 106/73.2 X |

Primary Examiner—Francis S. Husar
Assistant Examiner—K. J. Ramsey
Attorney, Agent, or Firm—Charles T. Silverberg; Louis L. Dachs; Max Geldin

[57] ABSTRACT

A method for fabricating superplastically formed/diffusion bonded structures wherein metal blanks of a titanium alloy are joined at selected areas by diffusion bonding and expanded superplastically to form a desired sandwich or integrally stiffened structure. In such method, the metal blanks are treated in selected areas with a "stopoff" material to prevent bonding at those areas during diffusion bonding and to permit forming or shaping at the same areas during superplastic forming. An improved stopoff compound is provided for this purpose, in the form of yttria of relatively coarse particle size, coarser than 5 microns, in a suitable volatilizable vehicle. Such stopoff compound is inert to reactive metals such as titanium at the high diffusion bonding temperatures, and permits relatively low breakthrough pressure-time product during superplastic forming, thereby preventing excessive strain or rupture of the metal through non-superplastic deformation.

16 Claims, 4 Drawing Figures

METHOD FOR FABRICATING SUPERPLASTICALLY FORMED/DIFFUSION BONDED STRUCTURES

BACKGROUND OF THE INVENTION

This invention relates to the fabrication of metallic sandwich and integrally stiffened structures, and is particularly directed to a method of making such structures by superplastic forming and diffusion bonding (SPF/DB), employing an improved composition specifically for facilitating breakthrough prior to superplastic forming.

A number of alloys exhibit superplasticity and are capable of being subjected to superplastic forming to produce parts of predetermined shapes. Superplasticity is the capability of a material to develop unusually high tensile elongation with reduced tendency toward local necking during deformation. However, this invention is particularly concerned with superplastic metals which are subject to contamination of surface integrity at forming temperatures. These are termed "reactive" metals. This includes alloys of titanium, zirconium and the refractory metals.

Diffusion bonding refers to the solid-state, metallurgical joining of surfaces of similar or dissimilar metals by applying heat and pressure for a time duration so as to effect intimate surface contact and cause co-mingling of atoms at the joint interface.

U.S. Pat. No. 3,927,817 discloses a method for fabrication of structures in which metal blanks, preferably of a titanium alloy, are joined at selected areas by diffusion bonding at elevated temperatures and pressures, and then subjected to superplastic forming to form a desired structure. The metal blanks are first treated at selected areas with a stopoff material, such as yttria, boron nitride, graphite, or alumina, to prevent bonding at such treated areas during diffusion bonding. During superplastic forming the metal blanks are expanded at the treated (unbonded) areas into contact with shaping members by increasing the internal pressure, preferably with inert gas, thus forming an expanded structure of a desired shape, essentially in a single operation.

Thus, after the bonds between adjacent metal blanks are formed during diffusion bonding, inert gas pressure, such as argon or helium, is applied to the interior network to superplastically form the unbonded portions of the adjacent metal sheets. For such superplastic forming to occur, gas must penetrate the entire interior network of unbonded (stopped off) areas. Initial flow of gas into an inlet, through the unbonded network and out the exit plumbing, is termed "breakthrough." If no breakthrough takes place, or if insufficient breakthrough takes place, acceptable superplastic forming cannot occur. Breakthrough may be characterized by the product of the time and pressure required for it to occur. If a combination of high pressure and extended time is required to effect breakthrough, the parts may be ruptured or improperly formed, and scrapped.

Resistance to breakthrough results from the combined effects of: (1) the small cross-sectional area of the stopoff path; (2) the tortuosity and length of the stopoff path; (3) the low gas permeability of the stopoff path after bonding; and, (4) the resistance to overall bending of the unbonded, unsupported span of the sheet metal adjacent to the stopoff and to the tool cavity. Both the small cross-sectional area and the stopoff path length and tortuosity are fixed by design considerations and are not good candidates for process control. However, the permeability and the resistance to bending are both subject to control as hereafter described.

During diffusion bonding, the stopoff layer is hot pressed by the bonding pressure and temperature and its permeability is significantly reduced. Any measures which tend to resist the reduction of permeability will result in an improved stopoff system. If stopoff were not present, the resistance of the unsupported span to bending is simply determined by the material's strength properties and the geometric configuration of the span. For the small deflections necessary to establish the very modest gas flows required for SPF/DB, the bending force, and therefore the breakthrough pressure time requirement, would be quite small except for the narrowest of spans. However, an appreciable additional resistance to bending must be overcome which results from adhesive bonds of the metal sheet to the stopoff compound and cohesive bonds within the stopoff compound. Both of these bond types are created by compression and sintering of the stopoff mass during the sustained pressure and temperature conditions of the bonding cycle. Any attempt to alter the adhesive bonding characteristics of the stopoff to the reactive metal sheet would tend to involve foreign additions and is likely to compromise the inert nature of the stopoff with respect to the sheet. However, cohesive bonding can be influenced by other than chemical changes. Hence it is necessary that the stopoff compound be one which does not develop a high cohesive strength nor very low permeability during diffusion bonding and thereby resist breakthrough prior to the superplastic forming operation.

In addition, it is necessary that the stopoff compound or composition be inert with respect to the reactive metal surface, so as to cause no formation of alpha-phase case on the metal surface. Alpha-case is the phenomenon whereby a reactive metal such as a titanium alloy that displays a normal microstructure, consisting of a mixture of alpha-phase (hexagonal crystal structure) grains and beta-phase (body centered crystal structure) grains, is converted to all alpha at and near the exposed surface by the diffusion of oxygen and/or nitrogen into the alloy matrix. The conversion to alpha structure, which has a high interstitial (oxygen and/or nitrogen) content, leads to a brittle layer on the surface which is particularly undesirable under fatigue loading conditions because of a tendency to initiate fatigue cracks.

Of a variety of stopoff compounds investigated, including alumina, graphite, boron nitride, silicon nitride, and others, yttria was the only one which was found to be sufficiently inert to reactive metals such as titanium and its alloys to avoid alpha case formation at the high temperatures encountered during diffusion bonding and superplastic forming. However, the use of yttria in its commercially available fine powder form often resulted in excessive breakthrough pressures and extended time periods to achieve breakthrough, with the attendant dangers and disadvantages noted above. Thus, in the above patent which discloses use of such yttria as stopoff compound, breakthrough pressures prior to superplastic forming are noted as ranging from 25 to 250 psi, and at such breakthrough pressures, time required to achieve breakthrough can require up to one or more hours. In terms of a pressure-time product, the fine commercial grade yttria gave undesirable breakthrough values usually in excess of 5000 psi-minutes.

Accordingly, one object of the invention is the provision of an improved procedure for producing SPF/DB structures.

Another object of the invention is the provision of a superplastic forming and diffusion bonding procedure for the above purpose, which provides a low breakthrough pressure-time product prior to superplastic forming, to permit forming to occur uniformly, avoid strain rates in excess of the superplastic range, and avoid excessive local thinning an/or rupture of the metal sheets.

A still further object is the provision in the above noted superplastic forming and diffusion bonding process of a stopoff compound for application to preselected areas of the metal sheets, which is inert to reactive metals such as titanium and its alloys, and which also provides low breakthrough pressure-time products to facilitate uniform and successful forming during the subsequent superplastic forming operation.

SUMMARY OF THE INVENTION

The high breakthrough pressure-time product exhibited by the use of yttria of the type heretofore commercially available as a stopoff compound results from the diffusion bonding cycle pressure typically at 300 psi, for one and one-half hours at 1700° F., for a Ti-6Al-4V alloy, which causes the yttria to develop low permeability and high adhesive and cohesive strengths and thereby introduces a significant resistance to breakthrough of inert gas prior to superplastic forming.

It has been found according to the invention that by controlling and reducing the degree of permeability loss and of cohesion, or the bonding of yttria particles to other yttria particles, satisfactorily low breakthrough pressure-time products can be achieved. Such control and reduction of the permeability loss and cohesive properties of the yttria stopoff compound can be achieved, according to the invention, by employing yttria of significantly coarser average particle size than the fine commercially available yttria powder that has a maximum particle size of approximately 2 microns. The use of yttria having a substantially coarser particle size than the fine commercial grade yttria, substantially reduces the cohesive properties of the yttria to reduce breakthrough pressure-time product, by decreasing the surface area and thus the sinterability of the yttria particles.

Similarly, the residual permeability after bonding under the same conditions will be greater for coarse particles than for fine particles. Hence by employing yttria of relatively coarse particle size, as defined in greater detail hereinafter, superplastic forming and diffusion bonding operations for production of metallic sandwich structures, e.g. as described in above U.S. Pat. No. 3,927,817 (integrally stiffened structures are also referred to as sandwich structures in this patent), can be readily and successfully accomplished using relatively low breakthrough pressure-time products prior to superplastic forming, usually not in excess of about 100 psi-minutes, to produce properly formed parts without defects or ruptures occurring during the subsequent superplastic forming operation.

BRIEF DESCRIPTION OF THE DRAWINGS

The invention will be more readily understood by reference to the detailed description below of certain preferred embodiments taken in connection with the accompanying drawings wherein.

DETAILED DESCRIPTION OF THE INVENTION

Figure 1:
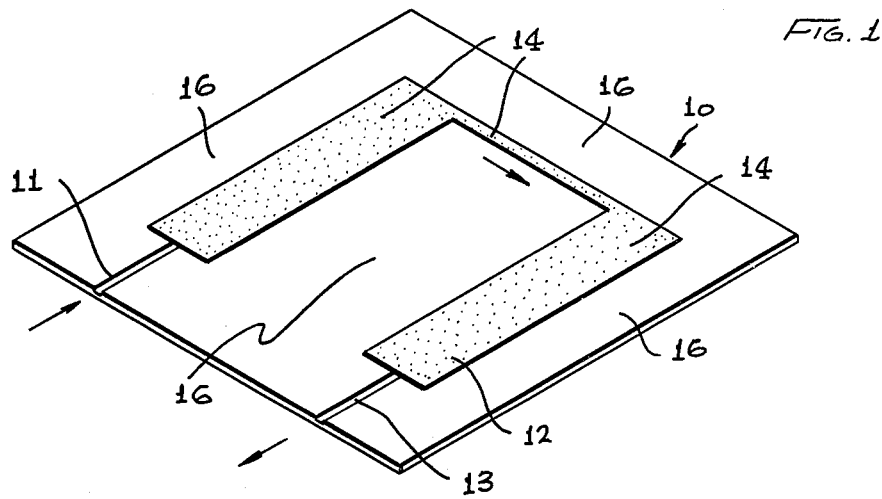
FIG. 1 illustrates a metallic sheet having an area of stopoff composition or paint applied to selected surfaces.

The essential component of the present stopoff composition is yttria of sufficiently coarse particle size to provide a low breakthrough pressure-time product prior to superplastic forming, as further described below. Such yttria is in the form of a relatively coarse material having particles of a size larger or coarser than 5 microns and most desirably with a substantial portion of the particles, e.g. 30-35%, coarser than 10 microns. This relatively coarse yttria material can be produced by heating (sintering) in known manner the commercially available normally fine yttria powders which generally have a maximum particle size of approximately 2 microns, to cause their agglomeration into larger particle sizes, usually followed by grinding or comminuting the agglomerated particles to the desired coarse size as noted above.

Although yttria of the above noted relatively coarse particle size is the preferred essential stopoff component of the invention, the invention concept is also applicable to any other compounds which, like yttria, have a high free energy of formation and are thus inert to reactive metals at high temperatures and which in their normal fine powder form are highly sinterable and require excessive breakthrough pressure-time products, but which can be formed into materials of sufficiently coarser particle size, as by sintering and agglomeration, to control and reduce the cohesiveness of the sintered mass resulting from the coarser particles during diffusion bonding, and provide a low breakthrough pressure-time product prior to superplastic forming as described in greater detail hereinafter.

The essential component of the stopoff compound, e.g. the yttria of relatively coarse particle size, is incorporated into a vehicle or carrier for the yttria, to form a liquid composition with the yttria particles suspended therein. The resulting composition, for example, can be in the form of a silk screen paint which can be applied to the metal sheets or blanks by the usual silk screen procedure, or the stopoff composition can be formulated as a spray for spray application to the metal sheets or for any other useful method of selective paint or film application. The vehicle for the yttria contains a binder to hold the yttria in position during bonding, but such binder must be sufficiently volatile to vaporize at temperatures substantially below those for diffusion bonding, and leave an essentially pure yttria layer at the high diffusion bonding temperature, with substantially no organic residue.

Accordingly, any organic resin in solid or liquid form and which has the above characteristics can be employed as the binder for the yttria. It has been found, for example, that an acrylic resin is particularly suitable as a binder, although other resins such as polyvinyl alcohol can also be employed. The acrylic resin can be in the form of an acrylic molding powder, the acrylic resin therein being, for example, polymethyl methacrylate.

There are also added to the organic binder various organic solvents for the binder or resin component. These include, for example, esters such as the low molecular weight alkyl acetates, e.g. butyl and ethyl acetate wherein the alkyl group contains up to four carbon atoms, ketons, such as acetone, aromatic hydrocarbons such as benzene or toluene, and mixtures thereof. The combination comprised of an acrylic resin binder and an alkyl acetate such as butyl acetate or ethyl acetate, or mixtures of such acetates, as solvents is particularly suitable as liquid vehicle for the yttria stopoff compound. However, the liquid vehicle can be comprised essentially of binder alone, and in the absence of solvent or thinner, where the binder is a liquid resin. Where a solvent is employed in combination with a binder, such solvent will also volatilize with the binder during heating of such liquid vehicle containing the yttria to diffusion bonding temperatures.

The proportion of yttria or other suitable stopoff compound, according to the invention, present in the liquid stopoff composition can range from about 100 to about 4,000 grams, usually about 300 to about 3500 grams, of yttria or other suitable stopoff compound, per liter of total organic liquid vehicle, including binder and solvent, where the latter is present. For example, the more dilute liquid compositions have a consistency compatible with spraying, while the more concentrated liquid compositions are utilized for silkscreening and brushing.

The stopoff compositions of the invention are usually produced by ball milling the components, e.g. for 1 to 2 hours, to assure good mixing and pigment (yttria) suspension, though other methods of mixing can be used.

The following are examples of stopoff compositions according to the invention:

EXAMPLE 1

| Silk Screen Paint | | |
|---|---|---|
| Components | grams | ml |
| Acrylic molding powder | 50 | |
| Butyl acetate | | 500 |
| Acetone | | 250 |
| Yttria (100% of the particles coarser than 5 microns, with 30–35% coarser than 10 microns) | 1,000 | |

The acrylic molding powder is believed to comprise essentially polymethyl methacrylate.

The above components are mixed in a ball mill and 250 ml acetone is added to the ball milled sludge for thinning.

EXAMPLE 2

| Spray Composition | | |
|---|---|---|
| Components | grams | ml |
| Acrylic molding powder (as in Example 1) | 50 | |
| Ethyl acetate | | 750 |
| Butyl acetate | | 250 |
| Yttria (as in Example 1) | 1,000 | |

The above components are mixed in a ball mill.

A mixture of 575 ml ethyl acetate and 125 ml butyl acetate as thinner, is added to the above ball milled composition.

Now referring to the drawing, in practicing the present invention, the stopoff paint of Example 1 or the stopoff composition of Example 2 is applied to selected areas or strips 12 of a clean titanium alloy sheet or blank 10, to prevent bonding in those areas. While other reactive metals could be used, this invention has been found to be particularly advantageous for use with a titanium alloy, such as Ti-6Al-4V. If the stopoff paint of Example 1 is used, it is applied by silk screening the paint by conventional silk screening procedure, e.g. in the form of strips, as indicated at 14, in any suitable configuration, over the preselected areas 12. If the stopoff composition of Example 2 is employed, it is sprayed by suitable means onto the stopoff areas 12, employing suitable masking to protect those areas 16 of the titanium alloy sheet which are to be bonded, including the area between the strips 14 and the peripheral areas around the strips. Grooves 11 and 13 are provided in sheet 10 to allow for passage of pressurizing fluid to the stopoff network.

Figure 2A:
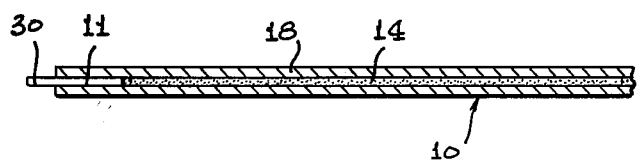
FIG. 2a is a section taken on line 2a—2a of FIG. 2.
Figure 2:
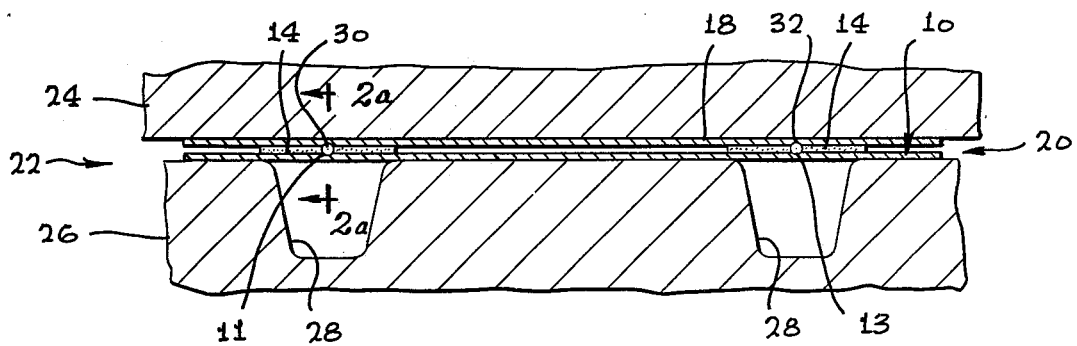
FIG. 2 illustrates an assembly of the metallic sheet containing stopoff areas illustrated in FIG. 1 as the bottom sheet, with a top metal sheet placed in contacct therewith, and the assembly inserted in a forming apparatus comprised of an upper and lower tool and subjected to selective diffusion bonding.

Referring to FIGS. 2 and 2a of the drawing, with the titanium alloy sheet 10 thus treated with the yttria stopoff composition according to the invention, utilized as the bottom sheet (it could alternately be the top sheet), a second clean titanium alloy sheet or blank 18 is placed as the top sheet, over the stopoff-treated sheet 10, with the sheet 18 in contact with the strips of stopoff composition 14, applied to the bottom sheet 10.

The resulting assembly 20 of titanium alloy sheets 10 and 18, with the strips of stopoff composition 14 therebetween, are placed in a forming apparatus, generally indicated at 22, and having an upper tool 24 and a lower tool 26. The lower tool contains a plurality, here shown as two, die cavities 28. A gas inlet 30 is provided in communication with groove 11 for introducing gas into the stack or assembly 20 and a gas outlet 32 in communication with groove 13 is provided for exiting gas from the assembly.

Diffusion bonding is accomplished by heating the sheet assembly or stock 20 to suitable diffusion bonding temperature while maintaining the assembly in an inert gas atmosphere, by passage, e.g. of helium or argon, through the stack via gas inlet and outlet 30 and 32 and into cavities 28 (through conduits not shown). When the metal sheets of the stack 20 have been heated to a suitable diffusion bonding temperature, pressure is applied to the stack by application of gas pressure in cavities 28 in the lower tool 26 against the lower surface of sheet 10. Pressure could alternately or in addition be provided by tooling 25 and 26. Diffusion bonding temperatures can vary from 1450° F. to about 1850° F., e.g. about 1700° F. for 6Al-4V titanium alloy, and bonding pressure can vary from about 100 psi to about 2,000 psi or more, usually from about 150 psi to about 600 psi. The time for diffusion bonding can range from as little as 30 minutes up to about 15 hours.

In a typical operation, a diffusion bonding cycle of 300 psi pressure applied for 1½ hours at 1700° F. was used to bond the unstoppedoff areas of the 6Al-4V titanium alloy, as indicated at 16, between the stopoff strips 14. As previously noted, constant purge of inert gas was maintained through the gas inlet and outlet 30 and 32 during the heat-up and diffusion bonding cycles to flush the volatilized organic components of the stopoff composition (strips 14) from the assembly, as well as to avoid any sheet contamination by air, leaving a layer of yttria in the areas 12.

Figure 3:
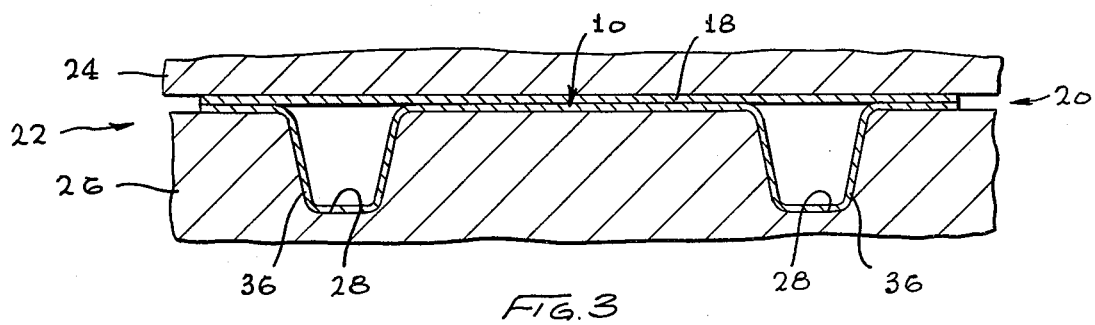
FIG. 3 illustrates forming the assembly of metal sheets in FIG. 2 into a predetermined shape by superplastic forming.

Now referring to FIG. 3 of the drawing, after diffusion bonding, gas pressure at inlet 30 and between the sheets 10 and 18 and in stopoff areas 12 is increased to initiate complete gas communication from inlet 30 through the stopoff pattern area to the exit 32, prior to superplastic forming. It is desirable to achieve this gas communication or breakthrough with nil to minimal forming of the part. This is so that the forming may be accomplished in a completely controlled manner. If the pressure-time product used to achieve breakthrough is a substantial portion of or even exceeds that required for the initial (and critical) part of the forming cycle, the forming process will be out of control and result in unsatisfactory parts. It should be noted that the temperatures used for breakthrough are normally in the same range as those for diffusion bonding and superplastic forming, i.e. 1650°–1750° F. for Ti-6Al-4V. For this reason, good breakthrough characteristics, best described by pressure-time product, are essential to the successful practice of SPF/DB.

The effectivity of the present invention is clearly indicated by the data presented in Table I. This data results from special breakthrough test panels in which several independent stopoff paths are individually plumbed so that when subjected to the same pressurization conditions, the breakthrough characteristics of each path may be independently evaluated. It is seen that the pressure-time product for coarse yttria in Table I ranges from about 3 to about 70 psi-minutes and is two orders of magnitude less than that of the regular fine yttria, previously the only form available. For further comparison, data on boron nitride as a stopoff are included. The average particle size of the boron nitride in these tests was between one and two microns. It is seen that boron nitride gives excellent pressure-time products, but unlike the yttria creates alpha-case contamination on the titanium surface. It should be noted that coarse yttria and boron nitride breakthrough pressure-time products are of the same order of magnitude.

TABLE I

Comparison of Breaktrhough Behavior

| Stopoff System | Pressure at Breakthrough PSI | Time to Breakthrough Minutes | Breakthrough Pressure-Time Product PSI-Minutes |
|---|---|---|---|
| Regular Yttria | 20 | 50 | 1,000 |
| Regular Yttria | 50 | 105 | 5,250 |
| Boron Nitride | 4 | 3 | 12 |
| Boron Nitride | 6 | 2 | 12 |
| Boron Nitride | 40 | .08 | 3 |
| Coarse Yttria | 64 | .5 | 32 |
| Coarse Yttria | 4 | 2 | 8 |
| Coarse Yttria | 6 | 5 | 30 |
| Coarse Yttria | 4 | 3 | 12 |
| Coarse Yttria | 14 | 5 | 70 |
| Coarse Yttria | 40 | .08 | 3 |

Another indication of the effectivity of the present invention is to consider the pressure-time product involved in the critical part of a superplastic forming cycle. While these cycles vary over a wide range according to the geometry of forming and the material properties and thickness, it might be generalized that this critical portion of the cycle may involve pressure-time products of 100 to 1000 psi-minutes. Thus, it is seen that the 1000 to 5000 psi-minutes for normal yttria is intolerable while the 12-70 psi-minutes for the coarse yttria is acceptable. Based on the above, the definition of a low breakthrough pressure-time product is, essentially, that product which permits forming to occur uniformly, avoids strain rates in excess of the superplastic range and avoids local thinning and/or rupture of the metal sheets in all cases. A low breakthrough pressure-time product is generally considered to be less than 100 psi-minutes.

After breakthrough, the stack 20 is superplastically formed under suitable temperature and pressure conditions (such as 1650°–1750° F. and 25–250 psi for Ti-6Al-4V) by stretching of the lower sheet at the unbonded areas 12 previously covered by the present stopoff composition into contact with the configured surfaces 28 of lower tool 26 to form the expanded portion 36 of assembly 20.

The superplastic forming and diffusion bonding operation, and the apparatus for carrying out such procedure, are described in detail in above U.S. Pat. No. 3,927,817. Such disclosure is incorporated herein by reference, but forms no part of the present invention.

It was noted that when employing the stopoff compositions of the invention, such as illustrated in Examples 1 and 2 above, and at temperature of 1700° F., for producing a structure as illustrated in FIG. 3, breakthrough pressure-time product values of 3–70 psi-minutes were obtained prior to superplastic forming, and the expanded portions 36 of the assembly under these conditions were found to be uniform in thickness, with no local necking, strains or ruptures present.

On the other hand, when employing stopoff paints or formulations having the same composition as Examples 1 and 2 above, but employing therein the commercially available yttria powder having a maximum particle size of about 2 microns, under the same conditions of diffusion bonding and superplastic forming temperatures, and for producing sandwich structures of the same shape, the breakthrough pressure-time product was substantially higher, e.g. approximately 5000 psi-minutes, resulting in expanded portions such as 36 of the assembly, which were non-uniform, and showing necking or excessively thin portions, and substantial local strain.

From the foregoing, it is seen that the invention provides an improved procedure for superplastic forming and diffusion bonding of certain metals, particularly titanium alloys, employing a stopoff composition to prevent diffusion bonding in preselected areas, containing as essential component, yttria of relatively coarse particle size, in excess of 5 microns, resulting in the provision of relatively low breakthrough pressure-time product for breakthrough prior to superplastic forming, and the production of metallic sandwich and integrally stiffened structures of good uniformity and absence of local strain and ruptures in those portions expanded during superplastic forming.

Since various changes and modifications of the invention will occur to and can be made readily by those skilled in the art without departing from the invention concept, the invention is not to be taken as limited except by the scope of the appended claims.

What is claimed is:

1. In the process for making a structure formed of at least two metallic workpieces of a reactive metal including the steps of treating said workpieces at selected areas with a stop-off composition to prevent bonding at said selected areas, placing said at least two workpieces into contact with each other, maintaining said workpieces under coordinated temperature-pressure-time duration conditions to produce diffusion bonding of said workpieces at preselected areas, and applying gas pressure between the contacting surfaces of said at least two workpieces to cause breakthrough at said selected areas and superplastic forming of at least one of said workpieces to stretch substantially in excess of its original surface area; the improvement which comprises utilizing a stop-off composition containing as an essential component yttria, having a particle size greater than 5 microns, and an inert organic liquid vehicle for said compound, said organic vehicle comprising a binder capable of volatilizing and leaving substantially no organic residue at elevated temperature below the diffusion bonding temperature of said reactive metal.

2. The process as defined in claim 1 also including utilizing a breakthrough pressure-time product sufficiently low to produce a structure containing expanded portions of uniform cross-section and substantially free of local strains and ruptures.

3. The process as defined in claim 2 wherein said reactive metal is a titanium alloy.

4. The process as defined in claim 3 wherein the temperature is maintained within a range of about 1,650° to about 1,750° F. during said diffusion bonding and said superplastic forming, and said pressure during said diffusion bonding is between about 150 and about 600 psi, and said breakthrough pressure-time product is not in excess of about 100 psi-minutes.

5. The process as defined in claim 4 wherein said breakthrough pressure-time product ranges from about 3 to about 70 psi-minutes.

6. The process as defined in claim 3 wherein said breakthrough pressure-time product is not in excess of about 100 psi-minutes.

7. The process as defined in claim 3 wherein said breakthrough pressure-time product is less than 10% of that resulting from the use of yttria having a maximum particle size of about 2 microns.

8. The process as defined in claim 1 wherein about 30 to about 35% of the yttria particles are of a size greater than 10 microns.

9. The process as defined in claim 8, said composition being in the form of a silk screen paint, said organic vehicle comprising acrylic molding powder as binder, and including butyl acetate and acetone, as solvents for said acrylic molding powder, employing a range from about 300 to about 3,500 grams of said yttria per liter of said organic vehicle.

10. The process as defined in claim 8, said composition being in the form of a spray composition, said organic vehicle comprising acrylic molding powder, and including ethyl acetate and butyl acetate as solvents for said acrylic molding powder, employing a range from about 300 to about 3,500 grams of said yttria per liter of said organic vehicle.

11. The process as defined in claim 1 employing a range from about 100 to about 4,000 grams of said yttria per liter of said organic vehicle.

12. The process as defined in claim 1 wherein said organic vehicle comprises a resin binder.

13. The process as defined in claim 12, said resin binder being an acrylic resin.

14. The process as defined in claim 12, said vehicle also including a solvent for said resin selected from the group consisting of esters, ketones, aromatic hydrocarbons, and mixtures thereof.

15. The process as defined in claim 1 wherein said liquid vehicle comprises an acrylic resin binder and including a low molecular weight alkyl acetate, wherein said alkyl group contains up to four carbon atoms, as solvent for said resin binder.

16. The process as defined in claim 15 wherein said alkyl acetate is selected from the group consisting of ethyl acetate, butyl acetate, and mixtures thereof.

* * * * *